(12) United States Patent
Tarantola et al.

(10) Patent No.: US 7,152,019 B2
(45) Date of Patent: Dec. 19, 2006

(54) SYSTEMS AND METHODS FOR SENSOR-BASED COMPUTING

(75) Inventors: Carlo Tarantola, Valbonne (FR); Grzegorz Wojcik, Wroclaw (PL); Maciej Skolecki, Warszawa (PL); Marcin Odrowaz-Sypniewski, Warszawa (PL)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 11/098,852

(22) Filed: Apr. 4, 2005

(65) Prior Publication Data

US 2006/0116842 A1    Jun. 1, 2006

Related U.S. Application Data

(60) Provisional application No. 60/632,013, filed on Nov. 30, 2004.

(51) Int. Cl.
*G06F 15/00* (2006.01)
(52) U.S. Cl. .................. 702/186; 702/188; 702/189
(58) Field of Classification Search .............. 702/186, 702/188, 189
See application file for complete search history.

(56) References Cited

U.S. PATENT DOCUMENTS

| 4,831,558 A | * | 5/1989 | Shoup et al. ............... 702/188 |
| 6,553,336 B1 | * | 4/2003 | Johnson et al. ............. 702/188 |
| 6,832,178 B1 | * | 12/2004 | Fernandez et al. .......... 702/189 |
| 2003/0101023 A1 | * | 5/2003 | Shah et al. ................. 702/186 |
| 2004/0243352 A1 | * | 12/2004 | Morozumi et al. ......... 702/186 |

* cited by examiner

*Primary Examiner*—Marc S. Hoff
*Assistant Examiner*—Janet L Suglo
(74) *Attorney, Agent, or Firm*—Townsend and Townsend and Crew LLP (57) ABSTRACT

Various embodiments of the invention provide devices, methods and systems, including without limitation data acquisition systems, that can provide flexible sensing and/or data acquisition solutions. An exemplary sensing device, which may be in communication with one or more computers, such as a server, etc., can include one or more sensor(s), a processor and/or a data store. The sensing device can, perhaps in response to instructions received from the computer, filter and/or otherwise process data acquired by the sensor before transmitting the desired data to the computer. The sensing device may store some or all of the acquired data locally and/or may transmit, replicate, etc. some or all of the stored data to the computer.

35 Claims, 4 Drawing Sheets

SYSTEMS AND METHODS FOR SENSOR-BASED COMPUTING

CROSS-REFERENCE TO RELATED APPLICATIONS

This application is a non-provisional of and claims the benefit of the filing date of provisional U.S. App. No. 60/632,013, filed Nov. 30, 2004 by Tarantola et al. and entitled "Systems and Methods for Sensor-Based Computing," the entire disclosure of which is incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to computer systems and more particularly, to sensor-based computing systems.

Increasingly, computers are used to interact with the physical world, often through the implementation of various sensors in communication with a computer. Many types of sensors have been implemented in this manner. For instance, sensors often have been used in the performance of experiments in the physical sciences, including chemistry and physics experiments, where temperature, pressure, location and/or motion sensors have been used to allow researchers to understand the physical and/or chemical processes occurring during the experiments. Similarly, in both industry and academia, a variety of more traditional sensors, such as mass/weight sensors (e.g., scales and balances), among others, have been used for a variety of purposes. More recently, other types of sensors have been used to automate previously labor-intensive operations; for example, a location sensor (such as a Global Positioning System ("GPS") sensor) can be used in place of a sextant, compass, etc. to assist in navigation, pathfinding, etc. Moreover, sensors (such as radio frequency identification ("RFID") sensors have begun to find use in inventory tracking systems, asset identification systems, and the like.

Generally, however, such sensors are implemented in a fairly centralized fashion. That is to say, the sensors themselves are distributed to the necessary locations but are often used only to acquire data, which then is transmitted back to a central computer (or set of computers) for data collection, analysis and/or storage. As the use of sensors becomes ever more widespread, the overhead (which can include, inter alia, both communications overhead and server workload) can become a limiting factor in the applications and/or scaling of such systems. Merely by way of example, those skilled in the art will appreciate that sophisticated sensors are often used in high-energy and/or particle physics experiments to record data about, for example, the disposition of particles of interest during the experiment. Often, there are many such sensors, each collecting a high volume of data, which is then transmitted to a computer for processing and/or analysis. Often, much of the data is not of interest to the experiment and is consequently discarded by the computer. In the interim, however, all of the data generally must be transmitted to the computer and stored (even if only temporarily) before a determination can be made that the data is not of interest, because the sensors themselves have no ability to process or filter the data before transmission.

Similarly, in a large inventory management system, thousands or millions of products each may comprise (or have affixed thereto) an RFID transmitter, and the system may comprise hundreds (or thousands) of sensors collecting data from such transmitters, data which can be used to track the inventory during manufacturing, storage, distribution, etc. Generally, however, these sensors are designed to acquire particular information and forward all of the acquired information to a central computer system for analysis. Consequently, as described above, the sensors have little or no ability to filter the acquired data, to adjust for the type of data to be acquired, etc.

Hence, there is a need in the art for more robust sensing and computing systems.

BRIEF SUMMARY OF THE INVENTION

Various embodiments of the invention provide devices, software, methods, and systems, including without limitation data acquisition systems, that can provide flexible sensing and/or data acquisition solutions. Particular embodiments, for example, can comprise sensing devices, which may be in communication with one or more computers, such as a server, etc. A sensing device used in accordance with some embodiments of the invention can include one or more sensor(s), a processor and/or a data store. Hence, in certain embodiments, the sensing device can, perhaps in response to instructions received from the computer, filter and/or otherwise process data acquired by the sensor before transmitting the desired data to the computer. In other embodiments, the sensing device may store some or all of the acquired data locally and/or may transmit, replicate, etc. some or all of the stored data to the computer.

Hence, one set of embodiments provides sensing devices. An exemplary sensing device may comprise at least one sensor, one or more processors and/or one or more data stores. The sensing device may also comprise instructions executable by the processor to acquire data with the at least one sensor. The acquired data may, in some cases, be raw data. The instructions may be further executable by the processor to process the data and/or to store the data in the data store. The data stored in the data store may comprise the union of the raw data and programming logic associated with the raw data. Merely by way of the example, the programming logic may be a set of filters specifying which raw data to retain, and the data stored in the data store, therefore, may comprise a set of raw data meeting the criteria of the filters. As another example, the programming logic may be an algorithm for transforming the raw data, and the data stored in the data store may be a data set representing the raw data after transformation by the algorithm.

In accordance with specific embodiments, the sensing device may be configured to communication with a computer (which may be a server computer, as described below, for example). Merely by way of example, the data store may be configured to store a data set, and/or communicating with the computer may comprise synchronizing at least a portion of the data set with the computer. In particular embodiments, the data store can be a random access memory device, a disk drive, a database (and, in particular cases, a lightweight database and/or a distributed database, which may be distributed among a plurality of sensing devices), etc. The database, in some embodiments, may be configured to be synchronized with a database on the computer.

Another set of embodiments provides computers, which may be configured for use in a sensor-based computing environment. One exemplary computer can be used in a distributed computing environment and/or may comprise a processor, a communication system and/or a data store. The communication system may be configured to provide communication between the processor and one or more sensing devices, each of which may be configured to acquire data with a sensor and store at least a portion of the acquired data as an individual data set. The data store may be configured to store a composite data set comprising data received from each of the sensing device(s).

The computer may also comprise a computer readable medium with instructions for the processor to receive data from one or more of the sensing device(s) and/or to store the received data as part of the composite data set. The instructions may also be executable by the processor to provide an instruction to one or more of the sensing device(s). Merely by way of example, if a sensing device comprises a sensor, the instruction provided to the sensing device can comprise a command to activate the sensing device, a command to acquire data with the sensor, a command to transmit data for reception by the computer, a command to synchronize some or all of the sensing device's individual data set with the computer's composite data set, etc. (Likewise, the instructions may be executable by the computer's processor to transmit some or all of the composite data set for reception by the sensing device(s).)

A further set of embodiments provides distributed computing systems, some of which may comprise sensing devices (e.g., as described above) and/or server computers, such as the computers described above. Merely by way of example, one system comprises a server computer and at least one sensing device, which may be in communication with the server computer. The sensing device (which may be a plurality of sensing devices) can include at least one sensor, a processor, and/or a data store. The sensing device can also include instructions executable by the sensing device to acquire data with the sensor(s), to process some or all of the acquired data, and/or to store some or all of the data. The server computer may comprise one or more processor(s) and a computer readable medium with instructions executable by the server computer to communicate with the sensing device. Merely by way of example, the computer may be configured to provide an instruction to the sensing device, and/or the sensing device may be configured to receive the instruction provided by the server computer and/or to act in accordance with the instruction provided by the server computer.

The sensing device also may be configured to transmit at least a portion of the acquired data for reception by the server computer, and/or the server computer may be configured to receive the data transmitted by the sensing device. Merely by way of example, the sensing device and the server computer may be configured to synchronize data. In some embodiments, the sensing device's data store may comprise a data set, and/or the server computer may comprise a second data store; the sensing device, therefore, may comprise instructions to synchronize at least a portion of the data set between its data store and the server's data store.

Yet another set of embodiments provides methods, including without limitation methods of distributed computing. Certain embodiments of the invention, for example, may provide methods of implementing the devices and/or systems described above. An exemplary method comprises providing a sensing device in communication with a server computer. The sensing device may be remote from the server computer. In some embodiments, the sensing device can comprise a processor, a data store and/or at least one sensor. The method can further include acquiring data with the at least one sensor, processing some or all of the acquired data with the processor, and/or storing some or all of the acquired data in the data store. In some cases, the data acquired by the at least one sensor may be raw data, and/or the data stored in the data store may comprise the union of the raw data and programming logic associated with the raw data.

In accordance with particular embodiments, the method can further comprise transmitting at least a portion of the data from the sensing device for reception by the server computer and/or synchronizing at least a portion of a data set with a data store local to the server computer. In other embodiments, the method comprises receiving at the sensing device an instruction provided by the server computer and/or acting in accordance with the instruction provided by the server computer. Examples of instructions can include a command to activate the sensor and/or deactivate the sensor, to acquire data with the sensor, to process acquired data in a particular manner, etc.

Processing the data may comprise filtering the data in to a set of desired data and a set of undesired data, and/or storing at least a portion of the data can comprise storing the set of desired data and/or discarding the set of undesired data. Processing the data can also include transforming the data.

A particular set of embodiments provides computer data structures for use in distributed computing environments. An exemplary data structure comprises a first data store local to a first sensing device. The sensing device may comprise a first sensor, and/or the first data store may be configured to store data acquired by the first sensor. The data structure may also comprise a composite data store local to a server computer. The composite data store may configured to receive at least some of the data stored in the first data store. Together, the first data store and the composite data store may comprise a distributed database, and/or the first data store may be configured to synchronize with the composite data store. The data structure may also comprise a second data store local to a second sensing device, which may comprise a second sensor. The second data store, therefore, may be configured to store data acquired by the second sensor. Further, the composite data store may be configured to receive at least some of the data stored in the second data store.

Other embodiments of the invention can comprise computer program products, which may be embodied on computer readable media and/or may be configured to implement methods of the invention and/or to operate systems and/or devices of the invention, including without limitation those described above.

BRIEF DESCRIPTION OF THE DRAWINGS

The invention has been briefly summarized above. A further understanding of the nature and advantages of the invention may be realized by reference to the figures, which are described in detail below. In the figures, like reference numerals may be used throughout several drawings to refer to similar components. In some instances, a sub-label consisting of a lower case letter is associated with a reference numeral to denote one of multiple similar components.

When reference is made to a reference numeral without specification to an existing sub-label, it is intended to refer to all such multiple similar components.

DETAILED DESCRIPTION OF THE INVENTION

1. Overview

Various embodiments of the invention provide devices, methods and systems, including without limitation data acquisition systems, that can provide flexible sensing and/or data acquisition solutions. Particular embodiments, for example, can comprise sensing devices, which may be in communication with one or more computers, such as a server, etc. A sensing device used in accordance with some embodiments of the invention can include one or more sensor(s), a processor and/or a data store. Hence, in certain embodiments, the sensing device can, perhaps in response to instructions received from the computer, filter and/or otherwise process data acquired by the sensor before transmitting the desired data to the computer. (In accordance with some embodiments, "data" can comprise the union of raw data—that is data, data that is acquired by the sensing device, sent to or received from sensors, etc.—together with programming logic, which can include binary code, textual rules, instructions in any programming language, etc.). In other embodiments, the sensing device may store some or all of the acquired data locally and/or may transmit, replicate, etc. some or all of the stored data to the computer.

Certain embodiments of the invention, therefore, can be used capture and/or acquire information from the physical world via a myriad of sensor types, including without limitation RFID, temperature, pressure, moisture, motion, location, barcode, weight/mass, shock detection, as well as any other of the variety of available types of sensors. Embodiments of the invention can provide the ability implement these sensors and provide required data in an efficient, scalable fashion. Particular embodiments of the invention can provide a bridge between the data acquisition and data management processes of sensor-based computing by providing relatively "intelligent" sensing devices (and/or systems, software and/or methods for implementing such devices). Such embodiments can be used to facilitate the acquisition of data and the translation of the data acquired by the variety of sensors for use by databases and/or applications that need the data. In particular, given the nature and the number of the these sensors in modern systems, certain embodiments of the invention enable sensing devices that have the intelligence to determine which data are needed by back-end systems (such as databases, etc.) and whether the data requires additional processing before transmission to the back-end system, often in response to dynamic conditions and/or requirements.

Merely by way of example, in accordance with one set of embodiments, a server computer may be in communication with a plurality of sensing devices, each of which can comprise one or more sensors (of any appropriate type, including without limitation those described elsewhere herein). Each of the sensing devices can also include a processor and/or a data store, which can be used to store data (either temporarily—such as in RAM—or relatively permanently, such as on a hard disk drive, non-volatile RAM, etc.). In operation, the server computer may provide an instruction to the sensing devices to collect a particular type of data, to collect data over a particular time interval, etc. A sensing device, therefore, may activate its sensor(s) to acquire data. In some cases, the acquired data in fact may be a superset of the data actually desired (i.e., the sensors may acquire more and/or different data than the desired data). Hence, the sensing device's processor may be configured to filter the acquired data (before and/or after it is stored in a data store), e.g., to remove the undesired data. In other cases, the acquired data may need additional processing in order to meet the request from the server computer, and such processing may be performed by the processor. Merely by way of example, the processor may be configured to transform the data (using any appropriate algorithm, etc.), for instance to convert raw data to a more usable format, to add data (such as a timestamp, etc.) to the data, and/or the like.

In accordance with some embodiments, some or all of the data may be transferred to the server computer (and/or to any other appropriate location). In a particular set of embodiments, for example, the sensing device's data store might comprise a database, and/or that database could be configured to synchronize with a database local to (and/or otherwise in communication with) the server computer. Merely by way of example, after the data has been acquired and/or any undesired data has been filtered out, the remaining data may be synchronized with the server. The server, therefore, might have a database comprising data synchronized with a plurality of sensing devices, each of which might have a synchronized data set comprising data relevant to and/or acquired by that sensing device. As used herein, the term "synchronize" means to ensure that there is consistent and/or similar set of data in at least two devices, which can include sensing devices, servers, etc. Thus, a sensing device may be synchronized with another sensing device, with a server, etc. Likewise, a server may be synchronized with a sensing device, another server, etc. (For ease of description, this document refers to the synchronization of data between devices. It should be understood, however, that synchronization, in many cases, may actually occur between respective databases local to and/or managed by the referenced devices.)

Of course, in some implementations, other arrangements are possible in accordance with embodiments of the invention. Merely by way of example, there might be no centralized data set at the server; instead, the entire data set could be distributed among various sensing devices and/or could be accessed as needed by the server. Alternatively, each sensing device might have a complete, possibly synchronized, replica of the server's data set, including, for example, data acquired by and/or relevant to other sensing devices as well as its own data. In particular embodiments, the sensing devices might be configured to synchronize with one another, with or without commands from a server. Based on the disclosure herein, one skilled in the art will appreciate that a variety of data organization schemes can be implemented in accordance with embodiments of the invention.

The discussion below of several exemplary embodiments describes additional details and features of certain embodiments of the invention.

2. Exemplary Embodiments

As mentioned above, embodiments of the invention include devices, systems, methods and software that can be used to allow for more efficient and/or distributed computing through the use of relatively intelligent sensing devices. One set of embodiments provides systems for distributed computing, such as the exemplary system 100 illustrated by FIG. 1. The system 100 may operate in a networked environment, and therefore may comprise a network 105. The network 105 may can be any type of network familiar to those skilled in the art that can support data communications using any of a variety of commercially-available protocols, including without limitation TCP/IP, SNA™, IPX™, AppleTalk™, and the like. Merely by way of example, the network 105 maybe a local area network ("LAN"), such as an Ethernet network, a Token-Ring™ network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, any appropriate RFID protocol, the Bluetooth™ protocol known in the art, and/or any other wireless protocol); and/or any combination of these and/or other networks.

Figure 1:
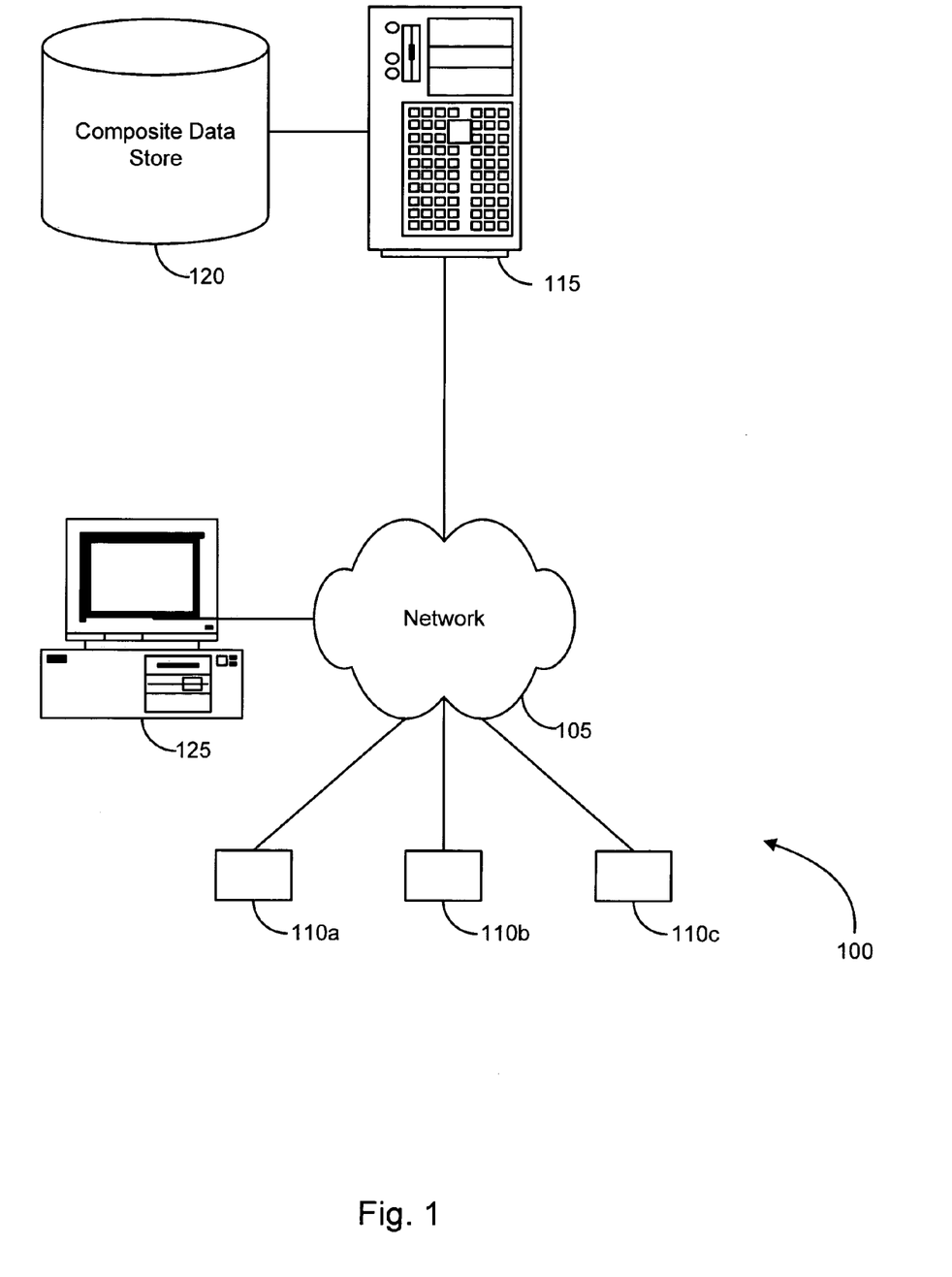
FIG. 1 illustrates a system in accordance with various embodiments of the invention.

The system 100 also can include one or more sensing devices 110, which may be configured, depending on the embodiment, to acquire data, process data, store data and/or communicate with other devices (including computers and other sensing devices), for example to exchange data. The sensing devices 110, therefore may be in communication (e.g., via the network 105) with other sensing devices, various computers (such as those described below) and/or any other appropriate device. In particular embodiments, for example, sensing devices 110 may need to be distributed (e.g., throughout a warehouse, etc.) in locations where hard-wired networks may be infeasible and/or unavailable, and the sensing devices 110 therefore may be equipped for wireless communication (e.g., through cellular links, 802.11x connections, Bluetooth connections, etc.). In other embodiments, sensing devices 110 may be distributed throughout a broad geographic area and therefore may be configured for wide area communications (e.g., through a WAN gateway (not shown), by wired and/or wireless telephone link, etc.). Those skilled in the art will appreciate the wide variety of available communication options and will understand, based on the disclosure herein, that any suitable options may be implemented for communication by the sensing devices 110.

Figure 3:
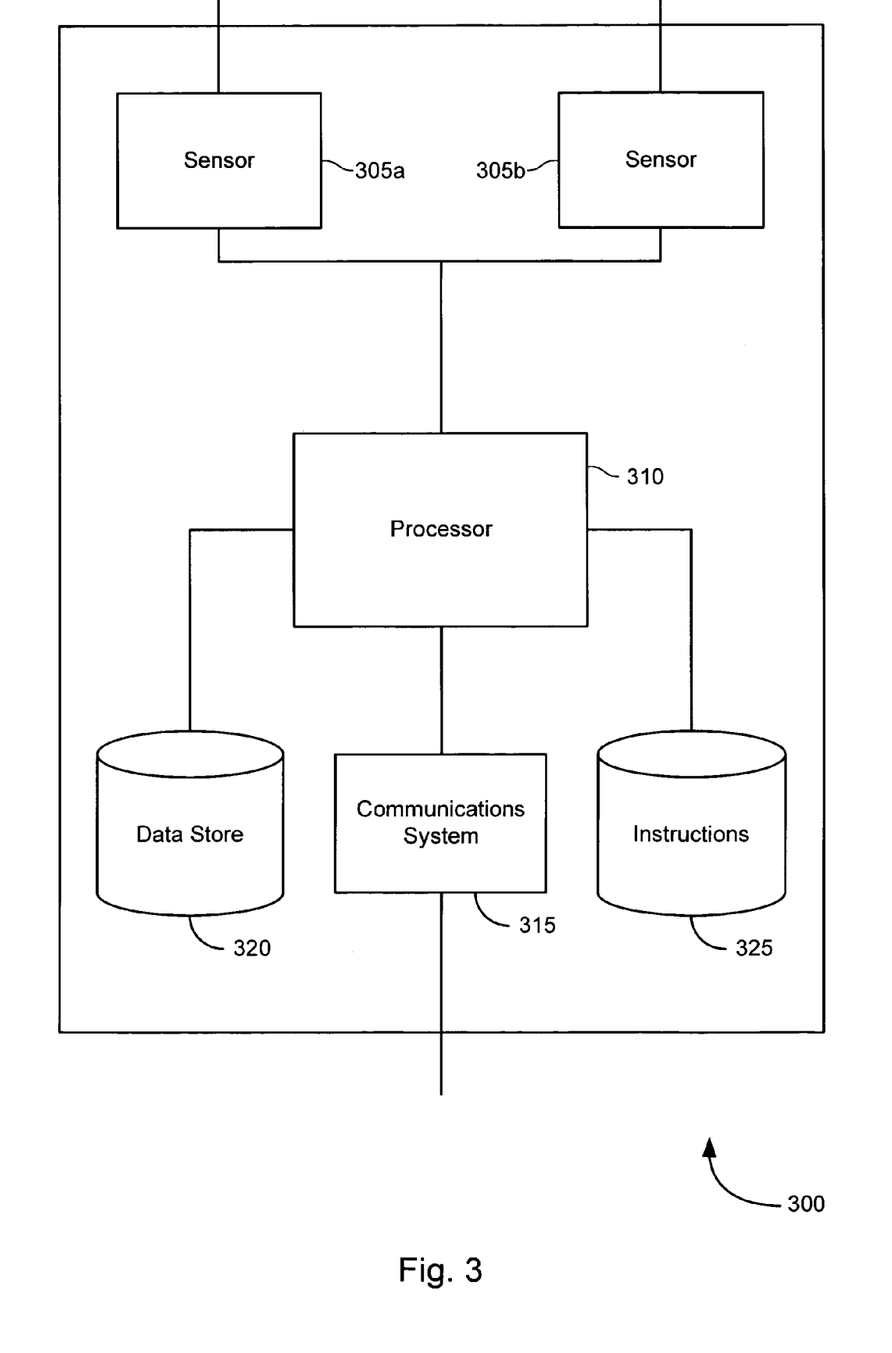
FIG. 3 is a generalized schematic diagram of a sensing device in accordance with various embodiments of the invention.

An exemplary sensing device is described below in detail with respect to FIG. 3 and need not be described further at this point, although it should be noted that sensing devices featuring structural and/or functional arrangements different than those described with respect to FIG. 3 are possible in accordance with various embodiments of the invention. Although FIG. 1 illustrates three sensing devices 110a, 110b and 110c, various embodiments of the invention can feature any number of sensing devices 110. Merely by way of example, some embodiments might utilize only a single sensing device, while other embodiments might incorporate hundreds or thousands of sensing devices, depending on the application. Moreover, while each of the sensing devices 110a, 110b, 110c, etc. might be structurally similar and/or configured to acquire, process and/or store data in similar fashion, certain embodiments might feature a variety of sensing devices configured to acquire different types of data. Merely by way of example, a particular embodiment can include a sensing device configured to acquire location data, a sensing device configured to acquire RFID data and a sensing device configured to acquire data from a bar code scanner.

The system may also include one or more server computers 115, which can be general purpose computers and/or specialized server computers (including, merely by way of example, PC servers, UNIX servers, mid-range servers, mainframe computers rack-mounted servers, etc.). (Although FIG. 1 illustrates only one server computer 115, those skilled in the art will appreciate, based on the disclosure here, that a plurality of server computers could be implemented in some embodiments, and/or that the functions described with respect to the server computer could be divided and/or shared between such a plurality of server computers).

The server computer 115 can be configured to coordinate the actions of the sensing devices 110, including without limitation transmitting to the sensing devices 110 (and/or receiving from the sensing devices 110) instructions, data, etc., perhaps via the network 105. The server computer 115 can also be used to store data received from the sensing devices 110 and/or to synchronize data with (and/or between) one or more sensing devices. (It should be noted that, while the term "server computer" is used to describe this coordinating computer, that term is used only for ease of reference and should not be interpreted to connote any specific capabilities required of the server computer 115, other than the ability to communicate with various sensing devices 110). Hence, the server computer 115 could be, in some cases, a standard PC configured with software for communicating with the sensing devices 110 and/or software (such as database software, for example) for storing data received from the sensing devices.

The server computer 115 can feature an operating system including any of those discussed below, as well as any commercially-available server operating systems. As appropriate, the server computer 115 can also run any of a variety of server applications and/or mid-tier applications, including HTTP servers, FTP servers, CGI servers, database servers, Java servers, business applications, and the like. The server computers 115 also may be one or more computers which can be capable of executing programs or scripts (perhaps in response to input from a user computer 125, described below). As one example, the server computer 115 may execute one or more web applications, which can be configured to allow a user to interact with the sensing devices 110 and/or data acquired by the sensing devices 110, for instance by providing instructions for the sensing devices 110. Such web applications may be implemented as one or more scripts or programs written in any programming language, such as Java™, C, C#™ or C++, and/or any scripting language, such as Perl, Python, or TCL, as well as combinations of any programming/scripting languages. The server(s) may also provide database services, perhaps through a relational database management system ("RDBMS"), including without limitation those commercially available from Oracle™, Microsoft™, Sybase™, IBM™ and the like, which can process requests from database clients running on a user computer 125 and/or can interact with a database used to store data received from the sensing devices 110.

In some cases, the software for performing methods of the invention (and/or certain components thereof) may be incorporated within any of these services. Merely by way of example, an RDBMS (and/or an RDBMS-based application, such as a warehouse management system, enterprise resource planning application, etc.) may include the necessary components to allow a computer (such as the server computer 115) operating the RDBMS to synchronize data with a sensing device 115. In other embodiments, certain procedures may be performed by a freestanding application and/or by the operating system itself. Those skilled in the art will appreciate, based on the disclosure herein, that there are a wide variety of ways in which the methods of the invention may be implemented.

In particular embodiments, the server computer 115 may be in communication with a composite data store 120, which can be used to store data received from, transmitted to, and/or synchronized with the sensing devices 110. The composite data store 120 may be incorporated within and/or managed by an RDBMS, and/or the composite data store 120 may be part of a distributed database system, which might also include lightweight database components local to one or more of the sensing devices 110. Merely by way of example, the composite data store may be an Oracle 10 g™ database, and/or each of the sensing devices 110 may be configured to operate an Oracle LITE™ database. In combination with Oracle's Sensor-Based Services™, The LITE database on a sensing device 110, therefore, may be configured to acquire data and/or to communicate (e.g., by synchronizing data, etc.) with the composite data store 120. In other embodiments, the composite data store may be implemented with a flat file, a file system, etc.

The composite data store 120 may reside in a variety of locations. By way of example, the composite data store 120 may reside on a storage medium local to (and/or resident in) one or more of the server computers 115. Alternatively, it may be remote from any or all of the devices and/or computers, and/or may be in communication (e.g., via the network 105) with one or more of these. In a particular set of embodiments, the composite data store 120 may reside in a storage-area network ("SAN") familiar to those skilled in the art. Similarly, any necessary files for performing the functions attributed to the computers 110, 115 (as well as the stand-alone devices 125, described below) may be stored locally on the respective computer/devices and/or remotely, as appropriate. In one set of embodiments, as mentioned above, the composite data store 120 may be a relational database, such as Oracle 10 g™, that is adapted to store, update, and retrieve data in response to SQL-formatted commands. The composite data store 120 may store data necessary to implement the methods of the invention, including without limitation data acquired by the sensing devices 110, as well as instructions for the sensing devices (which may be implemented by standard and/or proprietary calls from an RDBMS to each of the sensing devices, etc.).

As mentioned above, the system 100 may also include a user computer 125, which can be a general purpose personal computer (including, merely by way of example, a personal computer and/or laptop computer running various versions of Microsoft Corp.'s Windows™ and/or Apple Corp.'s Macintosh™ operating systems) and/or workstation computers running any of a variety of commercially-available UNIX™ or UNIX-like operating systems (including without limitation the variety of available GNU/Linux operating systems). The user computer 125 may also have any of a variety of applications, including one or more development systems, database client and/or server applications, web browser applications, etc. In particular, the user computer 125 may interact with the composite data store 120 and/or the sensing devices 110. Such interactions can include viewing and/or manipulating the data stored in the composite data store 120 and/or the sensing devices 110, issuing instructions and/or commands directly to the sensing devices and/or to any program (such as an RDBMS, etc.) on the server computer 115 designed to interact with the sensing devices. In alternative embodiments, the user computer 125 may be any other electronic device, such as a thin-client computer, Internet-enabled mobile telephone, and/or personal digital assistant, capable of communicating with the server computer 115, the composite data store 120 and/or the sensing devices 110 (e.g., via the network 105) and/or displaying and navigating web pages or other types of electronic documents. Although the exemplary system 100 is shown with one user computer 125, any number of user computers may be supported.

Figure 2:
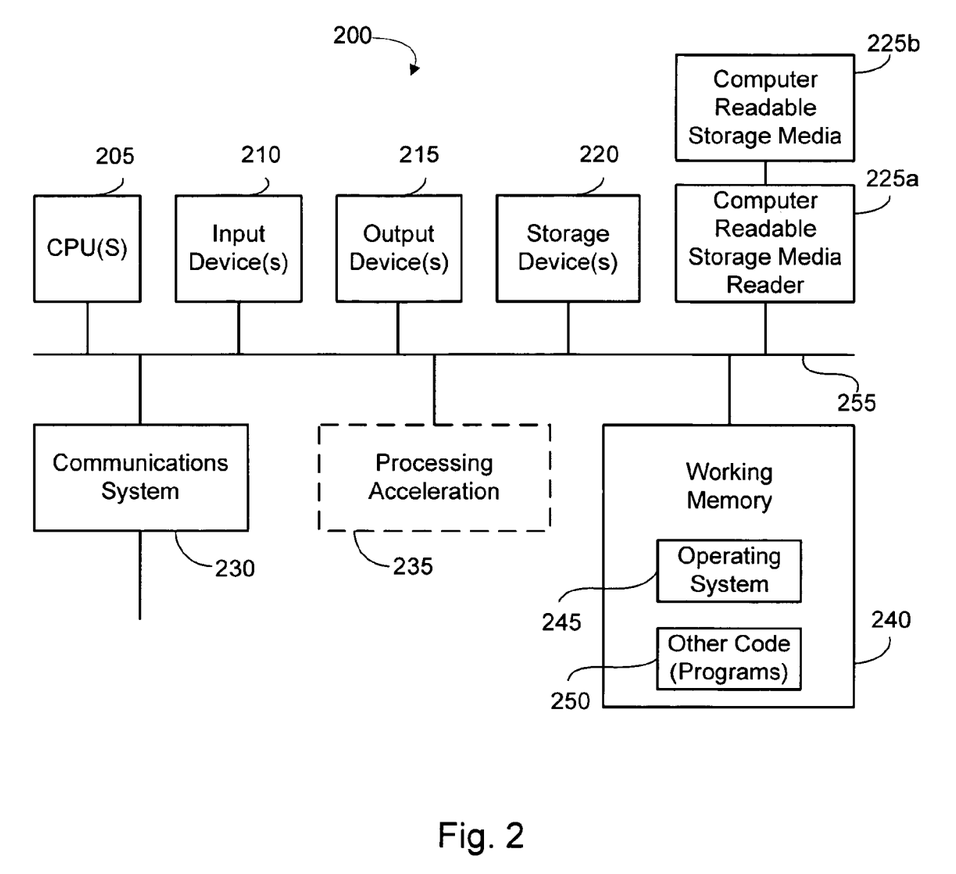
FIG. 2 is a generalized schematic diagram illustrating a computer system that may be used in accordance with various embodiments of the invention.

As noted above, in accordance with certain embodiments, standard computers/devices may be configured for use in the system 100. FIG. 2 provides a general illustration of one embodiment of a computer system 200, which may be exemplary of any of the computers/devices described above. The computer system 200 is shown comprising hardware elements that may be electrically coupled via a bus 255. The hardware elements may include one or more central processing units (CPUs) 205; one or more input devices 210 (e.g., a mouse, a keyboard, etc.); and/or one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a; a communications system 230 (e.g., a modem, a network card (wireless or wired), an infra-red communication device, etc.); and working memory 240, which may include RAM and ROM devices as described above. In some embodiments, the computer system 200 may also include a processing acceleration unit 235, which can include a DSP, a special-purpose processor and/or the like The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 105 and/or any other computer described above with respect to the system 100.

The computer system 200 may also comprise software elements, shown as being currently located within a working memory 240, including an operating system 245 and/or other code 250, such as one or more application programs (which may be an application, midlet, etc., configured to perform procedures in accordance with embodiments of the invention, as well as a client application, web browser, mid-tier application, RDBMS, etc.). The application programs may be designed to implement methods of the invention.

It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

FIG. 3 illustrates a sensing device 300, which may be used as one or more of the sensing devices 110 in the system 100 illustrated by FIG. 1. The sensing device 300 of FIG. 3 may comprise one or more sensors 305. As used herein, the term "sensor" should be interpreted to mean any device or apparatus that can be used to acquire physical and/or electronic information and convert such information into computer data as necessary. Examples of sensors that may be incorporated within embodiments of the invention include, but are not limited to, temperature sensors, moisture sensors, pressure sensors, location sensors, movement and/or acceleration sensors, shock detection sensors, weight (and/or mass) sensors, particle sensors, electromagnetic radiation sensors, RFID sensors and the like, as well as sensors described elsewhere herein. The sensing device 300 may include any number of sensors (two sensors 305a and 305b are illustrated on FIG. 3), and a particular sensing device can have sensors of different types. Merely by way of example, one sensor 305a may be an RFID sensor (e.g., an RFID transceiver), while another sensor 305b is a location sensor. Each sensor 305 may be integrated within a sensing device and/or may be connected thereto, perhaps having a separate housing comprising other components.

The exemplary sensing device 300 can also comprise a processor 310, which can be in communication with the sensor(s) 305. The processor 310 can be configured, inter alia, to control the operation of the sensors 305, process data acquired by the sensors 305, control the storage, transmission, synchronization, etc. of such data. In some embodiments, the processor 310 can comprise one or more special purpose processors, such as those available from ARM™, Motorola™ and others. In other cases, the processor 310 may comprise one or more general purpose processors, such as those available from Intel™, Advanced Micro Devices™ and others.

The processor 310 may also be in communication with a communications system 315, which can serve to provide communications, e.g., between the sensing device 300 and a server computer. Merely by way of example, the communications system 315 can provide connectivity with a network such as the network 105 of FIG. 1. The communications system 315 can include any necessary hardware and/or software for providing such communications, including without limitation, a wireless transceiver, modem (wired, wireless, etc.), a network interface (RJ45, etc.) and/or the like. In some cases, the communication system 315 can include components similar to those described with respect to the communications system 230 of FIG. 2. Those skilled in the art will appreciate that the components of the communication system 315 will vary according to the embodiment, depending in part on the type of network used, etc.

In accordance with some embodiments, the sensing device 300 may also include a data store local 320 to the sensing device. (As used in this context, the term "local" means that the data store 320 is specific to the sensing device and is not, for example, the composite data store 120 of a server computer 115. Hence, the data store 320 may reside within the sensing device and/or in proximity thereto, such as in separate enclosure connected with the sensing device, etc.). The data store 320 can be used, inter alia, to store data acquired by the sensors 305, produced by the processor 310 and/or received via the communication system 315. The data store 320 may be embodied on a hard drive, a RAM device (volatile or non-volatile), etc. In fact, any suitable storage medium (including without limitation those discussed herein) may be used to house the data store 320. In some embodiments, the data store 320 may be a database, such as an RDBMS, a synchronization engine, etc. The Oracle LITE™ database, for example, is a lightweight database that can be implemented on a sensing device. The data store 320 may be configured to communicate with other data stores, including without limitation data stores local to other sensing devices, a composite data store at a server computer, etc. Such communications can include commands, data transfers (receiving and/or sending data), database synchronization (which can be selective, e.g., a subset of the data stored in the data store 320, and/or full) and/or any other types of supported communications. In some cases, the data store of a sensing device (or of a plurality of sensing devices) may comprise a distributed database that is distributed between a plurality of sensing devices and/or a server computer. A composite data store may also be a part of this distributed database.

The processor 310 may be configured to perform instructions 325, which can be stored in RAM and/or ROM (of any type), and/or can comprise software, hardware, firmware, etc. Some of the instructions may be embedded in the processor 310. In some cases, certain instructions may be native to the sensing device 300. In other cases, certain of the instructions may be received from a server computer, user computer, etc. The instructions 325 can be executable by the processor 310 (perhaps in conjunction with other components of the sensing device 300) to perform procedures in accordance with embodiments of the invention. Merely by way of example, the sensing device may receive from a server computer instructions operable by the processor 310 to activate the sensors 305, collect data for a certain period of time, filter the data for a particular desired data set, store the desired data set in the data store 125 and/or synchronize the data set with a server computer (or a data store thereof). The instructions may also be executable to generate output in a suitable format, which can include any of a variety of standard and/or proprietary formats, such as XML, SOAP, etc. In some embodiments, some of the instructions may be embodied in an application program, such as Oracle Sensor-Based Services™.

As but one example, consider a sensing device configured with Oracle's LITE database technology. This particular sensing device might comprise an RFID sensor, which is connected with an embedded processor running the suitable software. The sensing device's software can include, without limitation, a driver for the RFID sensor, a data filter and an output generator, which might be based on a standardized internet technology—for example SOAP—for generating usable output from the sensing device. The sensing device can use local software (such as the Oracle LITE database) to allow a central database (such as a composite data store) to synchronize data with the sensing device. If desired, data processing and/or filtering could be implemented by utilizing Oracle's LITE database capabilities, Java stored procedures, etc. In this example, Oracle's LITE database can enable the user to change filtering rules at run-time. The LITE database also provides other built-in capabilities, such as synchronization and data storage. The usage of Oracle's LITE database allows the creation of "intelligent" filters local to the sensing device. The filtering rules for such intelligent filters may be based on the specific data received from the central database. This embodiment can also feature local processing of data, perhaps based on instructions received from a server computer. The use of the Oracle LITE database also enables the sensing device to store data about key events that appear during the system runtime.

Another set of embodiments provides methods for distributed and/or sensor-based computing. Such methods may be implemented by systems and/or sensing devices such as those depicted by FIGS. 1–3, although, in certain embodiments, the methods of the invention may be implemented within any suitable hardware and/or software framework and consequently are not limited to any particular implementation.

Figure 4:
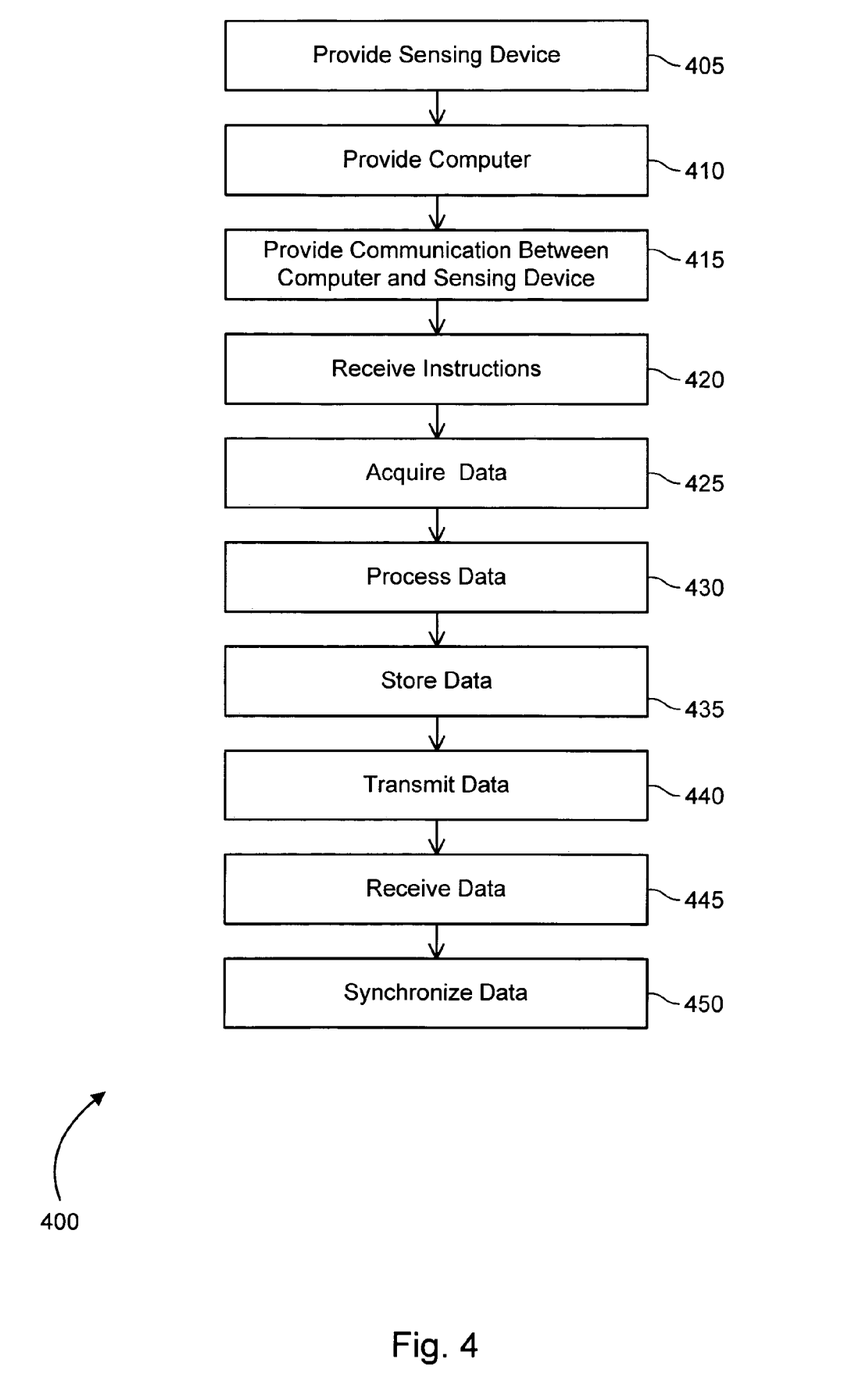
FIG. 4 is a process flow diagram illustrating a method in accordance with various embodiments of the invention.

FIG. 4 illustrates a method 400 that can be considered exemplary of certain embodiments of the invention. In accordance with some embodiments, the method can include providing one or more sensing devices (block 405), which may be sensing devices as described above, as well as one or more computers (block 410), which may be server computers and/or user computers as described above. The method may also include providing communication between the sensing device(s) and the computer(s) (block 415), e.g., via a network such as the network 105 described above.

In some cases, the method can include receiving instructions at the sensing device (block 420). The instructions may be received from a server computer, user computer, etc., and/or may comprise any of a variety of commands. Merely by way of example, the sensing device might receive an instruction to activate (or deactivate) a particular sensor, to acquire data of a particular type and/or for a particular time window. Other instructions could include commands to synchronize data, to implement a particular filtering and/or processing procedure on acquired data (and/or on data to be acquired in the future), etc. In some cases, the received instructions may include new and/or updated programs, applets, rule sets, etc.

At block 425, data may be acquired, e.g., by a sensor. The method of acquiring data necessarily will vary according to the type of sensor used. For example, an RFID sensor could acquire data by interrogating an RFID transmitter or "tag" and reporting the data received from the RFID transmitter. Alternatively, a physical sensor (temperature sensor, pressure sensor, etc.) can perform the necessary measurement and/or make the necessary observations. Data from these operations may then be reported, e.g., to the processor.

Optionally, the acquired data may be processed (block 430). In some embodiments, the processing of the data can be performed at the sensing device, for instance to minimize the processing required at a central server or to mitigate excessive network traffic. The step of processing data should be understood to mean any manipulation of the data and therefore can include a variety of operations. Merely by way of example, as noted above, a sensing device can be configured to filter data according to certain parameters (perhaps pursuant to instructions received from a server computer), and processing the data can comprising filtering the data according to these parameters. So, for instance, if a sensing device employs and RFID sensor, and the data acquired by the RFID sensor includes a serial number for a particular item in inventory, a date of manufacture for that item and a location of manufacture for the item, but the only desired data is the serial number of the item, processing the data can comprise filtering out the data about date and location of the item's manufacture. As another example, if a sensing device employs a pressure sensor and the acquired data includes a series of pressure measurements ranging between 0.5 ATM and 1.5 ATM over a period of time, but the desired data includes only measurements over 1.0 ATM, all of the data about pressures 1.0 ATM and lower could be filtered out.

In other cases, processing the data can include transforming the data. Merely by way of example, those skilled in the art will appreciate that sensors often record data in a raw format, and that such "raw" data must be transformed using some algorithm to produce the desired data. Consider, for instance, the pressure sensor discussed above. Perhaps the pressure sensor measures absolute pressures, but the data is required to be presented as a relative pressure. In this case, processing the data can include, for example, subtracting an ambient pressure from the acquired data to produce the desired relative pressure data.

In some cases, how data is processed may depend on rules (such as filtering rules, etc.) stored in a database local to the sensing device. In other cases, other software, hardware and/or firmware instructions may govern the processing of data. In many cases, some combination of database rules and other instructions may both govern the processing of data.

The data may also be stored, for instance at a data store local to the sensing device (block 435). As noted above, the data store may comprise a database. In such cases, storing the data can comprise executing a database procedure to import the data into the database. Merely by way of example, one or more tables in the database may be dedicated to storing acquired data, and one or more records may be created in these tables for storing the data. In this fashion, the data may be stored in an organized format. The fields of each record will, of course, depend on the nature of the data being stored. In other cases, the data may be stored in alternative data structures, including flat files, file systems, etc. The storage of data may occur before and/or after the data is processed. Merely by way of example, if the data store is a database, all acquired data may be stored, and/or any necessary filtering may be performed by a stored procedure in the database configured to purge records of unneeded data. In other embodiments, it may be more efficient from a storage perspective to filter data prior to storing the data. Similarly, other processing tasks may be performed before and/or after storage of the data.

In accordance with particular embodiments, the data may be transmitted (block 440), e.g., for reception by a central database, a composite data store, other sensing devices, etc. In some cases, the transmission of data may comprise the generation of output in the appropriate format (using an XML generator, a SOAP interface, etc.). In other cases, the transmission of data may be performed using standard and/or proprietary database transfer commands, such as SQL commands, stored procedures, etc. The data may be transmitted pursuant to a command from a server, automatically upon acquisition, processing and/or storage of the data, on specified intervals, etc. In some cases, there may not be a need for all of the acquired and/or stored data to be transmitted to the server. In such cases, a particular data set (comprising the data desired by the server) may be transmitted, and the remainder of the data may not be transferred. As discussed in detail below, transmitting the data can, in some cases, be part of a data synchronization procedure. Data transmitted by the sensing device can be received by a server computer (and/or a data store associated with the server computer) and stored as appropriate.

In some embodiments, a sensing device may also receive data (block 445) from a server computer, other sensing devices, etc. Merely by way of example, it may be desirable in some embodiments for a sensing device to receive data acquired by other sensing devices, either directly from the other sensing devices or via a central server. Receiving data may be accomplished in much the same fashion as transmitting data (except in reverse). Merely by way of example, data may be received in XML format, via a database transfer and/or SQL statement, etc. In some cases, received data may be processed and/or stored, perhaps in a manner similar to that discussed above.

In particular embodiments, the sensing device may be configured to synchronize data with a composite database, other sensing devices, etc. (block 450). In some cases, the steps of transmitting and/or receiving data may be performed by a synchronization process. In other cases, there may be separate procedures for transmitting, receiving and/or synchronizing data. In accordance with certain embodiments, particularly when a database is used as a data store, the procedure for data synchronization may be performed by the database (and/or an RDBMS managing the database). Merely by way of example, the Oracle LITE database can be configured to synchronize with one or more databases (such as an Oracle 10 g database, which might serve as a composite data store). Other synchronization schemes are possible as well. In any event, those skilled in the art will appreciate that data synchronization can, if desired, allow both the sensing device and the composite data store (or other device) to maintain a consistent and/or similar (or even an identical) data set. Merely by way of example, the synchronization process can be configured to update one of the data stores when data is added or modified in another data store. The synchronization process can also provide mechanisms to harmonize the data when it is modified in both locations. In general, however, the synchronization process can include transferring data between the sensing device and another device (e.g., a server computer, another sensing device, etc.). In particular cases, the synchronization might be one-way (that is, data added to and/or modified on the sensing device is sent to a server computer, but data added to and/or modified on the server computer is not sent to the sensing device, or vice-versa).

In some implementations, all of the data at the sensing device's data store may be synchronized (e.g., with a composite data store and/or with another sensing device's data store) and/or all of the data at a composite data store may be synchronized with one or more sensing devices. In other cases, however, a subset of stored data may be synchronized. Merely by way of example, if a composite data store contains data acquired and/or stored by a plurality of sensing devices, the synchronization process between the composite data store and a particular sensing device might only synchronize the data acquired and/or stored by that sensing device. As another example, it may not be necessary for a composite data store to maintain all of the data stored on a sensing device, so the synchronization process might be configured to synchronize only the data to be stored at the composite data store (which might, for example, comprise a particular data set in the sensing device's data store).

It should be noted that the methods discussed with respect to FIG. 4 are intended to be only exemplary in nature. Consequently, various embodiments may omit, substitute and/or add various procedures as appropriate. Merely by way of example, in a particular embodiment, data might not be stored at the sensing device but instead might simply be transmitted to a composite data store for storage after acquisition and/or processing. Similarly, in the foregoing description, for the purposes of illustration, various methods were described in a particular order. It should be appreciated that in alternative embodiments, the methods may be performed in an order different than that described. It should also be appreciated that the methods described above may be performed by hardware components and/or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable media, such as CD-ROMs or other type of optical disks, floppy diskettes, ROMs, RAMs, EPROMs, EEPROMs, magnetic or optical cards, flash memory, or other types of machine-readable media suitable for storing electronic instructions. Merely by way of example, some embodiments of the invention provide software programs, which may be executed on one or more computers, for performing the methods described above. In particular embodiments, for example, there may be a plurality of software components configured to execute on various hardware devices (such as a user computer, a server computer, a sensing device, etc.). Alternatively, the methods may be performed by a combination of hardware and software.

Hence, various embodiments of the invention provide inventive methods, systems, software products and data structures for providing distributed and/or sensor-based computing. The description above identifies certain exemplary embodiments for implementing the invention, but those skilled in the art will recognize that many modifications and variations are possible within the scope of the invention. The invention, therefore, is defined only by the claims set forth below

What is claimed is:

1. A computer for use in a distributed computing environment, the computer comprising:
   a processor;
   a communication system configured to provide communication between the processor and a plurality of sensing devices, each of the plurality of sensing devices being configured to acquire data with a sensor and store at least a portion of the acquired data as an individual data set;
   a data store in communication with the processor and configured to store a composite data set comprising data received from each of the plurality of sensing devices, wherein the data store is managed by a relational database management system and is part of a distributed database, the distributed database further comprising a set of lightweight database components local to at least one of the plurality of sensing devices; and
   a computer readable medium comprising instructions executable by the processor to:
      provide an instruction to at least one of the plurality of sensing devices;
      receive data from the at least one of the plurality of sensing devices, wherein the instruction to receive data from the at least one of the plurality of sensing devices comprises a command to synchronize at least a portion of the at least one of the plurality of sensing device's individual data set with the computer's composite data set; and
      store the received data as part of the composite data set.

2. A computer as recited in claim 1, wherein each of the plurality of sensing devices is configured to acquire raw data, and wherein the data received from the at least one sensing device comprises the union of at least some of the raw data and programming logic associated with the at least some of the raw data.

3. A computer as recited in claim 1, wherein the at least one sensing device comprises a sensor, and wherein the instruction provided to the at least one sensing device comprises a command to activate the sensor.

4. A computer as recited in claim 1, wherein the at least one sensing device comprises a sensor, and wherein the instruction provided to the at least one sensing device comprises a command to acquire data with the sensor.

5. A computer as recited in claim 1, wherein the instruction provided to the at least one sensing device comprises a command to transmit data for reception by the computer.

6. A computer as recited in claim 1, wherein the computer readable medium comprises further instructions executable by the processor to transmit at least a portion of the composite data set for reception by the at least one sensing device.

7. A computer as recited in claim 1, wherein at least one sensing device comprises a radio frequency identification (RFID) sensor.

8. A computer as recited in claim 1, wherein at least one sensing device is selected from the group consisting of a moisture sensor, a temperature sensor, a pressure sensor, a strain gauge, a mass or weight sensor, a motion sensor, and a location sensor.

9. A computer as recited in claim 1, wherein at least one sensing device is configured to communicate with a server computer.

10. A computer as recited in claim 1, wherein the data store comprises a random access memory device.

11. A computer as recited in claim 1, wherein the data store comprises a disk drive.

12. A computer as recited in claim 1, wherein the instruction provided to the at least one sensing device comprises a command to process acquired data in a particular manner.

13. A computer as recited in claim 1, wherein the at least one sensing device comprises at least a second processor.

14. A computer as recited in claim 1, wherein the at least one sensing device comprises at least a second processor, the at least a second processor being configured to filter the data into a set of desired data and a set of undesired data.

15. A computer as recited in claim 1, wherein:
the at least one sensing device comprises at least a second processor, the at least a second processor being configured to filter the data into a set of desired data and a set of undesired data; and
storing at least a portion of the acquired data as an individual data set comprises storing the set of desired data and discarding the set of undesired data.

16. A computer as recited in claim 1, wherein the at least one sensing device comprises:
a sensor means for acquiring data;
a means for processing the acquired data; and
a means for storing at least part of the acquired data.

17. A computer as recited in claim 16, wherein the at least one sensing device further comprises a means for receiving an instruction from a server computer.

18. In a system comprising a computer and a plurality of sensing devices, a method comprising:
providing communication between a computer and a plurality of sensing devices, each of the plurality of sensing devices being configured to acquire data with a sensor and store at least a portion of the acquired data as an individual data set;
providing an instruction to at least one of the plurality of sensing devices;
receiving data from the at least one of the plurality of sensing devices; and
storing, at a data store remote from the plurality of sensing devices and in communication with the computer, a composite data set comprising data received from each of the plurality of sensing devices;
wherein the data store is managed by a relational database management system and is part of a distributed database, the distributed database further comprising a set of lightweight database components local to at least one of the plurality of sensing devices; and
wherein receiving data from the at least one of the plurality of sensing devices comprises synchronizing at least a portion of the at least one of the plurality of sensing device's individual data set with the computer's composite data set.

19. A method as recited in claim 18, wherein each of the plurality of sensing devices is configured to acquire raw data, and wherein the data received from the at least one sensing device comprises the union of at least some of the raw data and programming logic associated with the at least some of the raw data.

20. A method as recited in claim 18, wherein the at least one sensing device comprises a sensor, and wherein providing and instruction to the at least one sensing device comprises issuing a command to activate the sensor.

21. A method as recited in claim 18, wherein the at least one sensing device comprises a sensor, and wherein providing an instruction to the at least one sensing device comprises issuing a command to acquire data with the sensor.

22. A method as recited in claim 18, wherein providing an instruction to the at least one sensing device comprises issuing a command to transmit data for reception by the computer.

23. A method as recited in claim 18, wherein providing communication between the computer and the plurality of sensing devices comprises transmitting at least a portion of the composite data set for reception by the at least one sensing device.

24. A method as recited in claim 18, wherein at least one sensing device comprises a radio frequency identification (RFID) sensor.

25. A method as recited in claim 18, wherein at least one sensing device is selected from the group consisting of a moisture sensor, a temperature sensor, a pressure sensor, a strain gauge, a mass or weight sensor, a motion sensor, and a location sensor.

26. A method as recited in claim 18, wherein at least one sensing device is configured to communicate with a server computer.

27. A method as recited in claim 18, wherein the data store comprises a random access memory device.

28. A method as recited in claim 18, wherein the data store comprises a disk drive.

29. A method as recited in claim 18, wherein providing an instruction to the at least one sensing device comprises issuing a command to process acquired data in a particular manner.

30. A method as recited in claim 18, wherein the at least one sensing device comprises at least a second processor.

31. A method as recited in claim 18, wherein the at least one sensing device comprises at least a second processor, the at least a second processor being configured to filter the data into a set of desired data and a set of undesired data.

32. A method as recited in claim 18, wherein:
the at least one sensing device comprises at least a second processor, the at least a second processor being configured to filter the data into a set of desired data and a set of undesired data; and
storing at least a portion of the acquired data as an individual data set comprises storing the set of desired data and discarding the set of undesired data.

33. A method as recited in claim 18, wherein the at least one sensing device comprises:

a sensor means for acquiring data;

a means for processing the acquired data; and a means for storing at least part of the acquired data.

34. A method as recited in claim 18, wherein the at least one sensing device further comprises a means for receiving an instruction from a server computer.

35. A computer program product stored on a computer readable medium, the computer program product comprising a set of instructions executable by a computer, the set of instructions comprising:

instructions to provide communication between the computer and a plurality of sensing devices, each of the plurality of sensing devices being configured to acquire data with a sensor and store at least a portion of the acquired data as an individual data set;

instructions to provide an instruction to at least one of the plurality of sensing devices;

instructions to receive data from the at least one of the plurality of sensing devices; and instructions to store, at a data store remote from the plurality of sensing devices and in communication with the computer, a composite data set comprising data received from each of the plurality of sensing devices;

wherein the data store is managed by a relational database management system and is part of a distributed database, the distributed database further comprising a set of lightweight database components local to at least one of the plurality of sensing devices; and wherein receiving data from the at least one of the plurality of sensing devices comprises synchronizing at least a portion of the at least one of the plurality of sensing device's individual data set with the computer's composite data set.

* * * * *